(12) United States Patent
Tomioka et al.

(10) Patent No.: US 7,364,811 B2
(45) Date of Patent: Apr. 29, 2008

(54) FUEL CELL

(75) Inventors: Kentaro Tomioka, Sayama (JP); Kei Matsuoka, Kawasaki (JP); Hiroaki Hirazawa, Inagi (JP); Yuusuke Sato, Tokyo (JP); Eiichi Sakaue, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 667 days.

(21) Appl. No.: 10/945,432

(22) Filed: Sep. 21, 2004

(65) Prior Publication Data

US 2005/0079398 A1    Apr. 14, 2005

(30) Foreign Application Priority Data

Sep. 30, 2003  (JP)  ............... 2003-342331

(51) Int. Cl.
*H01M 8/04* (2006.01)
(52) U.S. Cl. .................................. 429/26; 429/38
(58) Field of Classification Search .................. 429/26, 429/34, 38, 39
See application file for complete search history.

(56) References Cited

U.S. PATENT DOCUMENTS 5,407,756 A * 4/1995 Sprouse ................ 429/26 X
2005/0079394 A1 * 4/2005 Tomioka et al. ............... 429/20

FOREIGN PATENT DOCUMENTS

| JP | 7-006777 | | 1/1995 |
|----|----------|---|--------|
| JP | 10-284107 | * | 10/1998 |
| JP | 2000-058092 | * | 2/2000 |

OTHER PUBLICATIONS

Computer-generated English translation of JP-07-006,777 (Iwasa et al.), cited by applicants (doc date Jan. 1995).*

* cited by examiner

*Primary Examiner*—Stephen J. Kalafut
(74) *Attorney, Agent, or Firm*—Pillsbury Winthrop Shaw Pittman, LLP (57) ABSTRACT

In a housing of a fuel cell are arranged an electromotive unit, a fuel tank, an anode passage through which the fuel is circulated between the electromotive unit and the fuel tank, an air supply section which supplies air to the electromotive unit, and a cathode passage through which products from the electromotive unit are discharged. The cathode passage has a first passage extending from the electromotive unit, branch passages which diverge from the first passage, a reservoir portion which communicates with the first passage and lower ends of the branch passages and is stored with water discharged from the first passage and water condensed in the branch passages, and a recovery passage which guides the water stored in the reservoir portion into the fuel tank. A radiator section is provided on the branch passages.

11 Claims, 7 Drawing Sheets

FUEL CELL

CROSS-REFERENCE TO RELATED APPLICATIONS

This application is based upon and claims the benefit of priority from prior Japanese Patent Application No. 2003-342331, filed Sep. 30, 2003, the entire contents of which are incorporated herein by reference.

BACKGROUND OF THE INVENTION

1. Field of the Invention

The present invention relates to a fuel cell usable as a power source for an electronic device or the like.

2. Description of the Related Art

Currently, secondary batteries, such as lithium ion batteries, are mainly used as power sources for electronic devices, such as portable notebook personal computers (hereinafter referred to as notebook PC's), mobile devices, etc. These modern electronic devices have increasingly higher functions and require increased power consumption and longer operating time. To meet these requirements, compact, high-output fuel cells that require no charging are expected as novel power sources. Various types of fuel cell exist. A direct methanol fuel cell (hereinafter referred to as DMF) that uses a methanol solution as its fuel, in particular, has advantages over one that uses hydrogen as its fuel; easier fuel handling and simpler construction. Thus, the DMF is a power source for an electronic device that is currently drawing a lot of attention.

Normally, a DMF has a case that houses a fuel tank, mixing tank, liquid pump, air pump, etc. The fuel tank contains high-concentration methanol. The methanol in the fuel tank is diluted with water in the mixing tank. The liquid pump pressure-feeds the methanol that is diluted in the mixing tank to an electromotive unit. The air pump is used to supply air to the electromotive unit. The electromotive unit has an anode and a cathode. It generates power based on chemical reaction by feeding the diluted methanol and air to the anode and cathode sides, respectively. As this is done, the electromotive unit is heated to high temperature by reaction heat that is produced by a chemical change. In general, the amount of heat produced by a fuel cell is proportional to the amount of power generated by it.

According to a fuel cell described in Jan. Pat. Appl. KHAKI Publication No. 7-6777, for example, heat that is produced by power generation is discharged into the case via the surface of the electromotive unit and anode and cathode passages. Air within the case is discharged for ventilation with a cooling fan or air blower that is attached to the inner surface of the case. Thus, the fuel cell can be kept at a desired operating temperature without undergoing an excessive increase in temperature.

As reaction products that result from the power generation in the fuel cell described above, carbon dioxide and water are produced on the anode and cathode sides, respectively. As mentioned before, the heat produced by the power generation is discharged through the anode and cathode passages. However, some of the water as a reaction product is discharged in the form of steam into the case of the fuel cell. If the fuel cell is cooled by the steam discharge through the cathode passage, therefore, the water is gradually converted into steam and reduced, so that necessary water for the power generating reaction cannot be secured satisfactorily. In consequence, the power generating capacity of the fuel cell inevitably lowers despite the presence of the residual fuel.

BRIEF SUMMARY OF THE INVENTION

A fuel cell according to an aspect of the present invention comprises: a housing; an electromotive unit which is located in the housing and generates power based on a chemical reaction; a fuel tank which is located in the housing and contains a fuel; an anode passage through which the fuel is circulated between the electromotive unit and the fuel tank; an air supply section which supplies air to the electromotive unit; a cathode passage which is connected to the electromotive unit and through which products from the electromotive unit are discharged; and a radiator section in the cathode passage.

The cathode passage has a first passage which extends from the electromotive unit, a plurality of branch passages which diverge from the first passage, a reservoir portion which communicates with the first passage and respective lower ends of the branch passages and is stored with water discharged from the first passage and water condensed in the branch passages, and a recovery passage which guides the water stored in the reservoir portion into the fuel tank. The radiator section is located corresponding to the branch passages.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Fuel cells according to embodiments of the present invention will now be described in detail with reference to the accompanying drawings.

Figure 1:
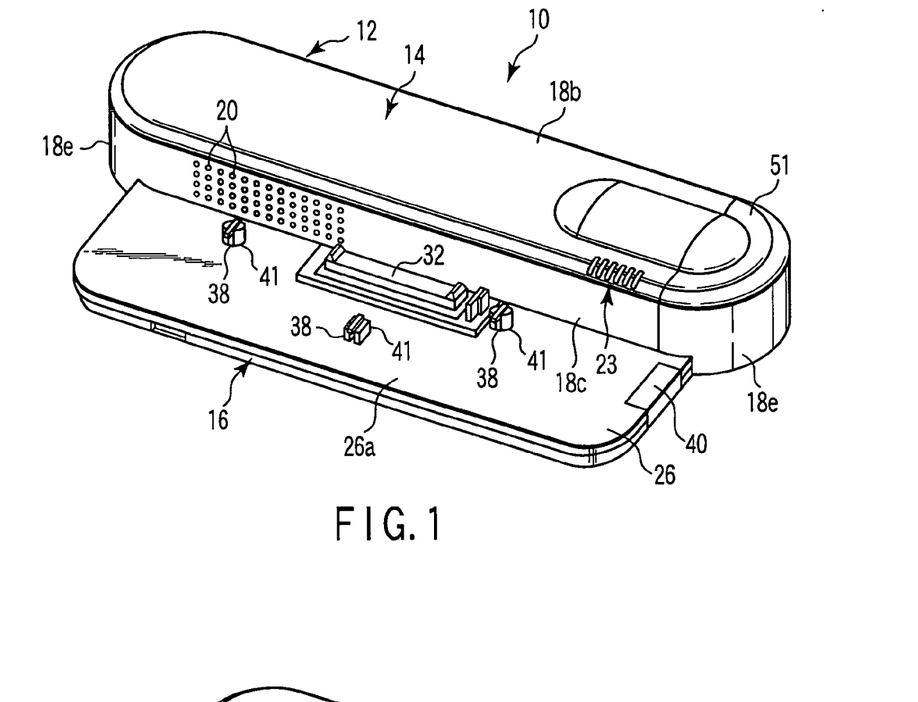
FIG. 1 is a perspective view showing a fuel cell according to an embodiment of the invention.
Figure 2:
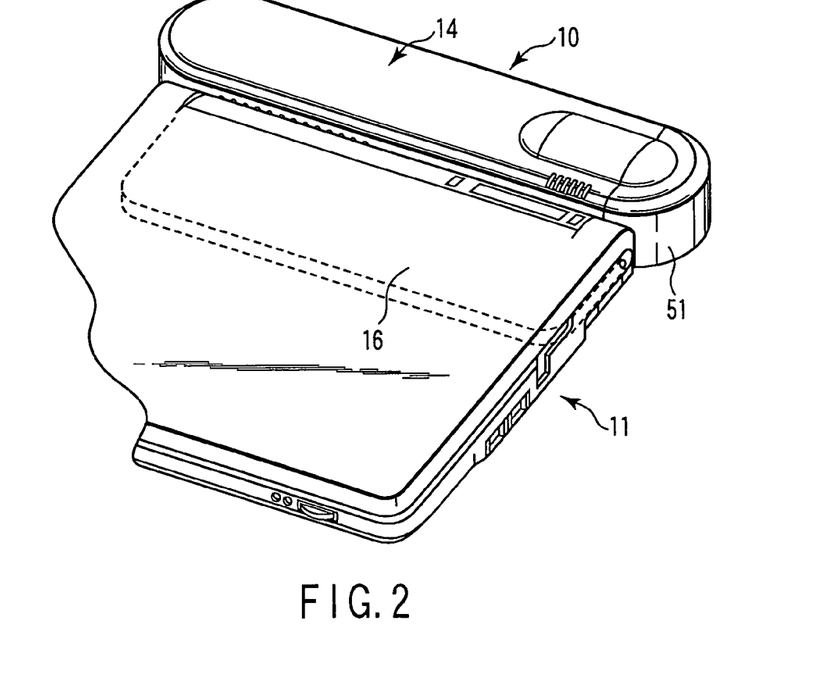
FIG. 2 is a perspective view showing the fuel cell connected to a personal computer.
Figure 3:
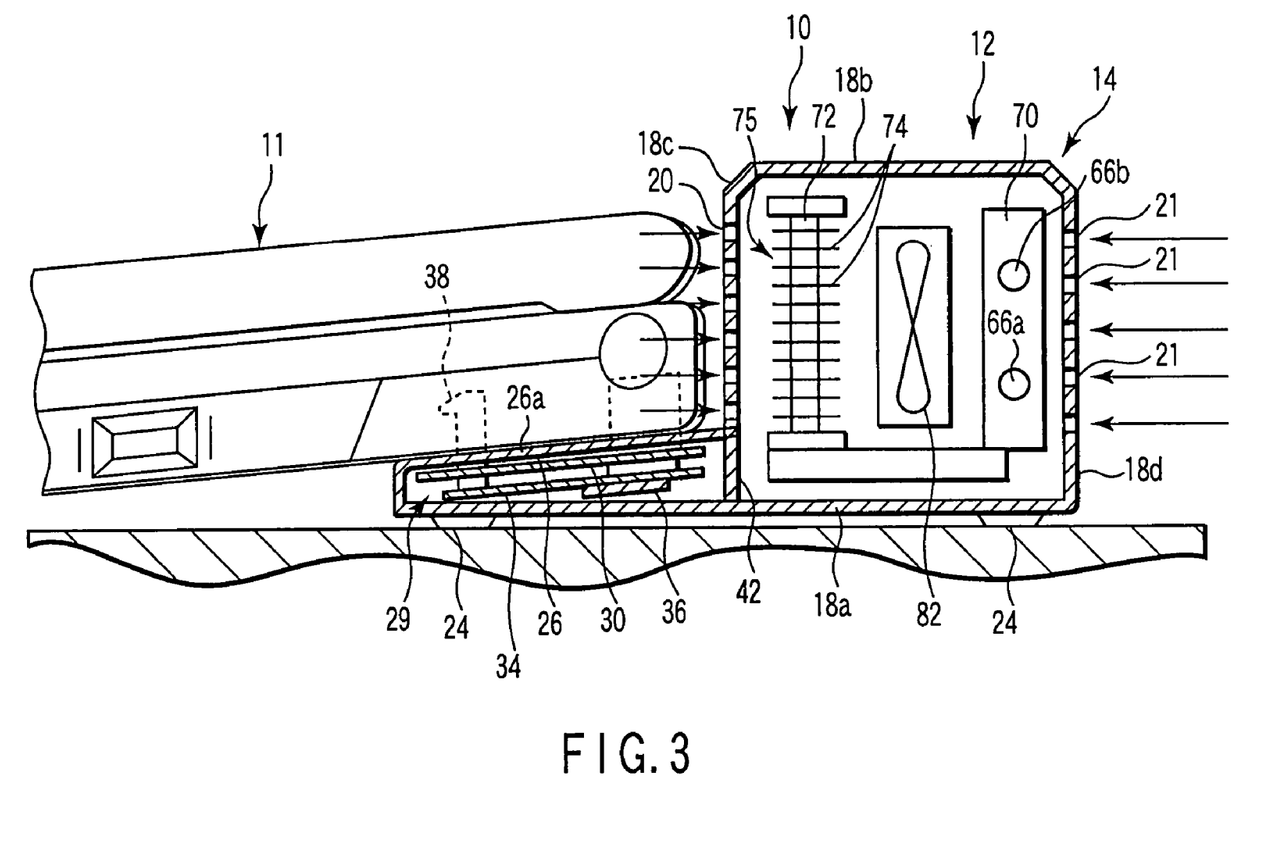
FIG. 3 is a sectional view showing the fuel cell and the personal computer.

As shown in FIGS. 1 to 3, a fuel cell 10 is composed of DMF that use methanol as a liquid fuel. It can be used as a power source for an electronic device, such as a personal computer 11.

The fuel cell 10 is provided with a housing 12. The housing 12 has a substantially prism-shaped body 14 that extends horizontally, and a bearer section 16 that extends from the body. The bearer section 16 is a flat rectangular structure that can carry a rear portion of the personal computer 11 thereon. The body 14 houses a fuel tank, electromotive unit, mixing tank, etc., which constitute a generator section (mentioned later). A control section 29, a locking mechanism for locking the computer 11, etc. Are arranged in the bearer section 16.

As shown in FIGS. 1 to 3, the body 14 has a flat bottom wall 18a, top wall 18b, front wall 18c, rear wall 18d, and a pair of sidewalks 18e. The bottom wall 18a is integral with a bottom wall of the bearer section 16. The top wall 18b extends substantially parallel to the bottom wall 18a. The front wall 18c is situated between the walls 18a and 18b. Each sidewalk 18e has an outwardly convex curved surface. A large number of vents 20 are formed in the front wall 18c. Corresponding in position to the vents 20, a large number of vents 21 are formed in the rear wall 18d. One of the sidewalks 18e of the body 14 has a large number of vents 22, which serve as exhaust holes. Legs 24 are arranged on the outer surface of the bottom wall 18a. Indicators 23 for indicating the operating state of the fuel cell 10 are arranged on the front end portion of the top wall 18b of the body 14.

The bearer section 16 is provided with a flat top wall 26 that extends forward from the lower end part of the front wall 18c of the body 14. The top wall 26 faces the front half of the bottom wall 18a across a gap and extends slightly declining from the body side. The top wall 26 forms a supporting surface 26a on which the personal computer 11 is placed.

As shown in FIGS. 1 to 4, the bearer section 16 houses the control section 29 for controlling the operation of the generator section (mentioned later). The control section 29 is provided with a control circuit board 30 that is located in the bearer section 16 and extends substantially parallel to the top wall 26. Electronic components, including semiconductor devices 28 and a connector 32, are mounted on the circuit board 30. The connector 32 is located adjacent to the body 14 in the center of the bearer section 16 and projects from the supporting surface 26a through the top wall 26. The control section 29 is provided with a power source (not shown) for driving the generator section.

Figure 4:
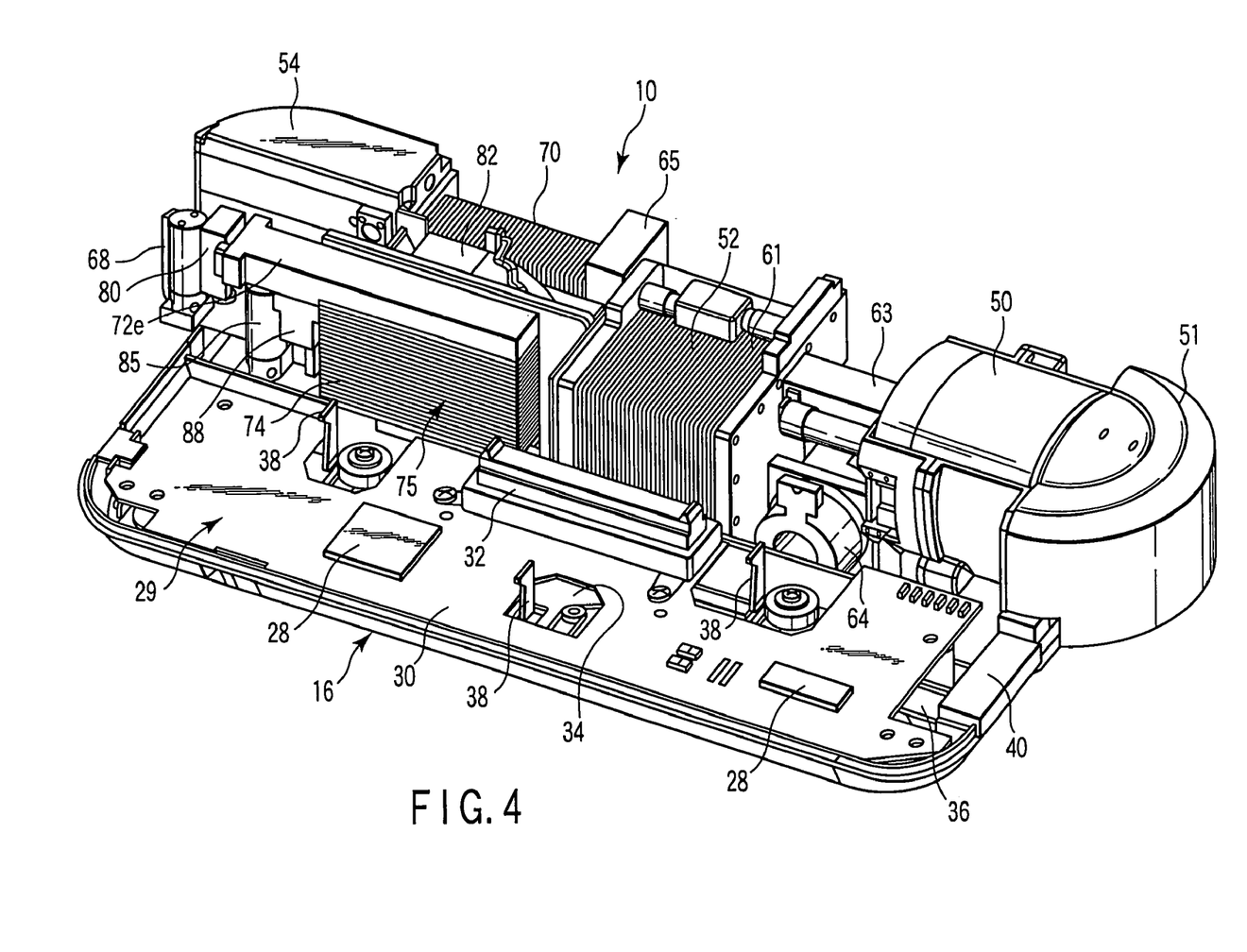
FIG. 4 is a perspective view showing the interior of the fuel cell.

The bearer section 16 houses a locking plate 34 which constitutes the locking mechanism and is movable in the width direction. Three hooks 38, for example, are set up on the locking plate 34 and project from the supporting surface 26a through the top wall 26. Located in the bearer section 16 is an eject lever 36, which moves the locking plate 34, along with the hooks 38, toward an unlocked position. An eject button 40 for manipulating the eject lever 36 is provided on one side edge of the bearer section 16. Positioning protrusions 41 are formed adjacent to the hooks 38 on the supporting surface 26a.

As shown in FIG. 3, the interior of the bearer section 16 that houses the control circuit board 30 and the interior of the body 14 in which the generator section is located are divided by partition wall 42 set up on the bottom wall 18a. The partition wall 42 has a notch (not shown) through which wiring for electrically connecting the generator section and the circuit board 30 is passed.

As shown in FIGS. 2 and 3, the rear end portion of the personal computer 11 is placed on the supporting surface 26a of the bearer section 16 in a manner such that it is positioned by the positioning protrusions 41. The computer 11 engages the hooks 38 and is locked in a mounting position. A connector (not shown) of the computer 11 is connected mechanically and electrically to the connector 32 of the bearer section 16. Thus, the fuel cell 10 and the personal computer 11 are connected mechanically and electrically to each other.

Figure 5:
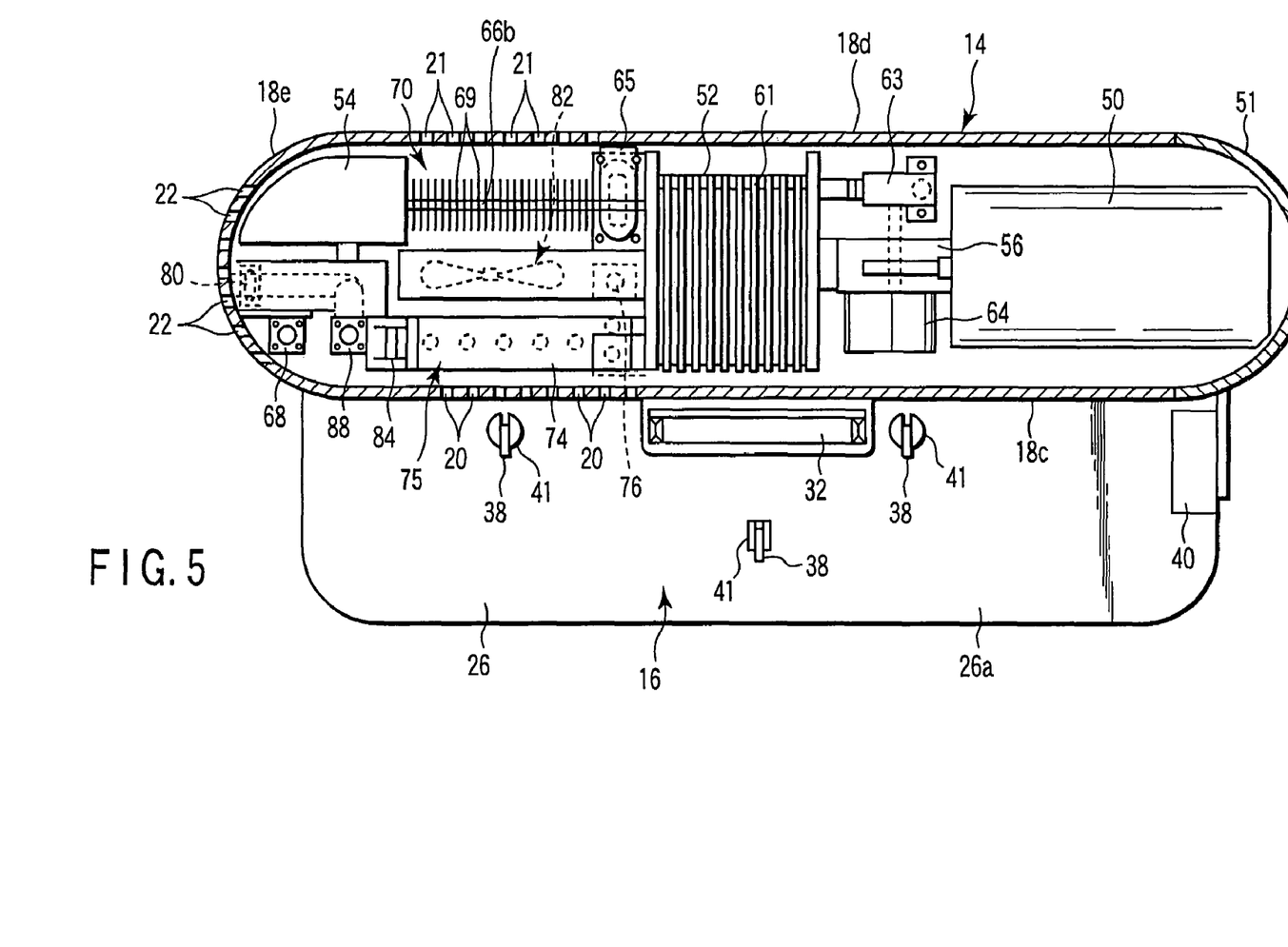
FIG. 5 is a plan view, partially in section, showing the fuel cell.
Figure 6:
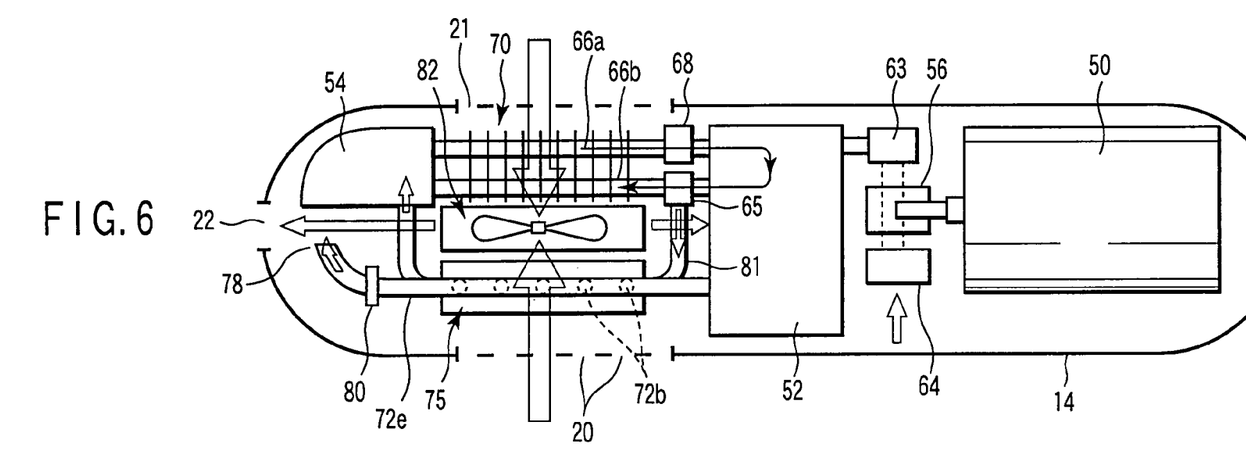
FIG. 6 is a view schematically showing a generator section of the fuel cell.

As shown in FIGS. 4 to 6, the generator section comprises a fuel tank 50 on one side in the body 14, an electromotive unit 52 in the central portion of the body, and a mixing tank 54 on the other side in the body. The electromotive unit 52 generates power based on a chemical reaction. The fuel tank 50 contains high-concentration methanol as a liquid fuel. The tank 50 is formed as a cartridge that can be attached to and detached from the body 14. One side portion of the body 14 is formed as a cover 51 that can be removed when the tank 50 is attached or detached. The fuel tank 50 is connected to the mixing tank 54 by means of a fuel supply line (not shown). In the fuel supply line is arranged a first liquid pump 56 which feeds the fuel from the fuel tank to the mixing tank.

Figure 7:
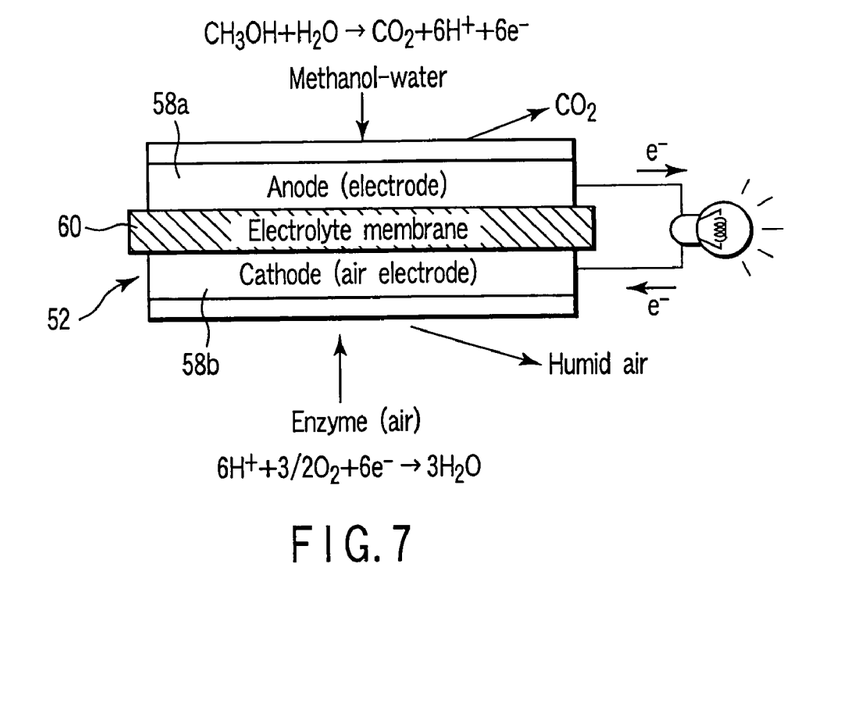
FIG. 7 is a view typically showing a cell structure of an electromotive unit of the fuel cell.

As shown in FIG. 7, the electromotive unit 52 is formed by laminating a plurality of cells. Each cell is formed of an anode (fuel electrode) 58a, a cathode (air electrode) 58b, and an electrolyte membrane 60 between the electrodes. A large number of cooling fins 61 are arranged around the electromotive unit 52.

As shown in FIGS. 4 to 6, the body 14 houses an air pump 64 that supplies air to the cathode 58b of the electromotive unit 52 through an air valve 63. The air pump 64 constitutes an air supply section. A fuel supply pipe 66a and a fuel recovery pipe 66b are connected between the electromotive unit 52 and the mixing tank 54. They form an anode passage through which the fuel is circulated between the cathode 58b of the electromotive unit 52 and the mixing tank 54. The fuel supply pipe 66a is connected with a second liquid pump 68 that feeds the fuel from the mixing tank 54 to the electromotive unit 52. The fuel recovery pipe 66b is provided with a gas-liquid separator 65 for separating the fuel discharged from the electromotive unit 52 from carbon dioxide produced by a chemical reaction. A large number of vertically extending radiator fins 69 are mounted around the fuel supply pipe 66a and the fuel recovery pipe 66b, and constitute an anode cooler 70. The vents 21 in the rear wall 18d of the body 14 are opposed to the anode cooler 70.

As shown in FIGS. 3 to 8, a discharge pipe 72 is connected to the electromotive unit 52 and defines a cathode passage through which products of power generation and air are discharged. The cathode passage has a first passage 72a, branch passages 72b, reservoir portion 72c, recovery passage 72d, and second passage 72e. The first passage 72a extends from the electromotive unit 52. The branch passages 72b diverge from the first passage 72a and extend at an angle to the horizontal direction. The reservoir portion 72c communicates with the first passage 72a and the respective lower ends of the branch passages 72b. It is stored with water discharged from the first passage 72a and water condensed in the branch passages 72b. The recovery passage 72d guides the water stored in the reservoir portion 72c into the mixing tank 54. The second passage 72e communicates with the respective upper ends of the branch passages 72b. In the present embodiment, the branch passages 72b extend individually in the vertical direction.

Figure 8:
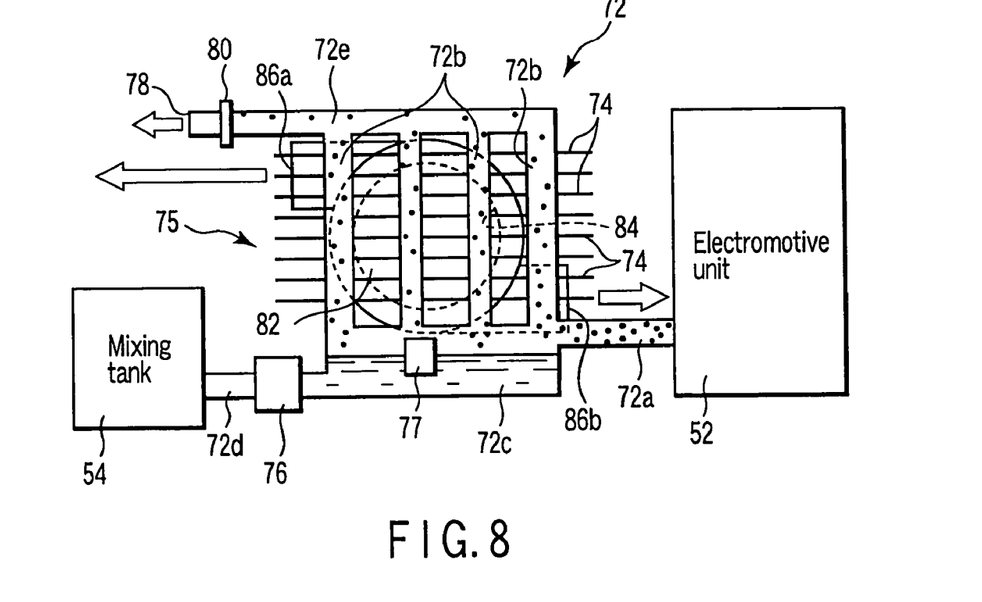
FIG. 8 is a view typically showing a cathode passage and a cathode cooler of the fuel cell.

The recovery passage 72d is provided with a recovery pump 76 that supplies the water in the reservoir portion 72c to the mixing tank 54. Located in the reservoir portion 72c is a water level detector 77 that detects the level of the water in the reservoir portion.

A large number of horizontally extending radiator fins 74 are mounted around the discharge pipe 72 that forms the branch passages 72b, and constitute a cathode cooler 75. The cathode cooler 75, which includes the branch passages 72b, is opposed to the anode cooler 70 with a gap between them. The second passage 72e extends substantially horizontally and has an exhaust port 78, which is situated near the vents 22 of the body 14 and opens toward the vents 22. In the second passage 72e, an exhaust valve 80 is located near the exhaust port 78. Further, the second passage 72e is provided with a gas discharge pipe 81, which guides carbon dioxide separated by the gas-liquid separator 65 into the second passage 72e. The vents 20 that are formed in the front wall 18c of the body 14 are opposed to the cathode cooler 75.

In the body 14, a cooling fan 82, formed of a centrifugal fan, is provided between and opposite the anode cooler 70 and the cathode cooler 75. The cooling fan 82 is located so that the rotation axis of its blades extends substantially horizontally and at right angles to the anode and cathode coolers 70 and 75. As is evident from FIG. 8, the cooling fan 82 has a case that covers the blades. The case has intake ports 84 opposed to the anode and cathode coolers 70 and 75 and two exhaust ports 86a and 86b that open in a direction tangent to the rotation direction of the blades. The exhaust port 86a opens toward the vents 22 of the body 14, and the other exhaust port 86b toward the electromotive unit 52.

Further, the generator section is provided with a concentration sensor 88 and a concentration detection pump 85. The sensor 88 detects the concentration of the fuel in the mixing tank 54. The pump 85 circulates the fuel in the mixing tank through the sensor.

The first and second liquid pumps 56 and 68, air pump 64, recovery pump 76, concentration detection pump 85, air valve 63, exhaust valve 80, and cooling fan 82 which are arranged in the body 14 and constitute the generator section, are connected electrically to the control circuit board 30 and controlled by the circuit board. The water level detector 77 and the concentration sensor 88 are connected to the control circuit board 30, and deliver their respective detection signals to the circuit board. Wires (not shown) that connect these electrical parts, sensors, and control circuit board 30 are pulled around from inside the body 14 into the bearer section 16 through the notch (not shown) in the spring portion 42.

If the fuel cell 10 constructed in this manner is used as a power source for the personal computer 11, the rear end portion of the computer is first placed on the bearer section 16 of the fuel cell, locked in position, and connected electrically to the fuel cell through the connector 32. In this state, the power generation by the fuel cell 10 is started. In this case, methanol is supplied from the fuel tank 50 to the mixing tank 54 by the first liquid pump 56 and diluted to a given concentration with water for use as a solvent that flows back from the electromotive unit 52. The methanol that is diluted in the mixing tank 54 is supplied through the anode passage to the anode 58a of the electromotive unit 52 by the second liquid pump 68. On the other hand, air is supplied to the cathode 58b of the electromotive unit 52 by the air pump 64. As shown in FIG. 7, the supplied methanol and air undergo a chemical reaction in the electrolyte membrane 60 between the anode 58a and the cathode 58b. Thereupon, electric power is generated between the anode 58a and the cathode 58b. The generated power is supplied to the personal computer 11 through the control circuit board 30 and the connector 32.

As the power generation reaction advances, carbon dioxide and water are produced as reaction products on the sides of the anode 58a and the cathode 58b, respectively, of the electromotive unit 52. The carbon dioxide and methanol that are formed on the anode side are fed into the gas-liquid separator 65 and subjected to gas-liquid separation in it. Thereafter, the carbon dioxide is delivered to the cathode passage through the gas discharge pipe 81. The methanol is returned to the mixing tank 54 through the anode passage.

As shown in FIGS. 6 and 8, most of the water produced on the side of the cathode 58b is converted into steam, which, along with air, is discharged into the cathode passage. The discharged water and steam pass through the first passage 72a, and the water is delivered to the reservoir portion 72c. The steam and air flow upward through the branch passages 72b to the second passage 72e. As this is done, the steam that flows through the branch passages 72b is cooled and condensed by the cathode cooler 75. Water that is produced by the condensation flows downward in the branch passages 72b by gravity and is recovered in the reservoir portion 72c. The water recovered in the reservoir portion 72c is delivered to the mixing tank 54 by the recovery pump 76, mixed with the methanol, and then fed again to the electromotive unit 52.

Some of the air and steam that are fed to the second passage 72e pass through the exhaust valve 80, and are discharged into the body 14 through the exhaust port 78 and further to the outside through the vents 22 of the body. The carbon dioxide that is discharged from the anode side of the electromotive unit 52 passes through the second passage 72e, and is discharged into the body 14 through the exhaust port 78 and further to the outside through the vents 22 of the body.

While fuel cell 10 is operating, the cooling fan 82 is actuated, whereupon the outside air is introduced into the body 14 through the vents 20 and 21 in the body. As shown in FIGS. 6 and 8, the outside air that is introduced into the body 14 through the vents 20 and the air in the body 14 pass around the cathode cooler 75 to cool it, and are then sucked into the fan case through one of the intake ports 84 for the cooling fan 82. The outside air that is introduced into the body 14 through the vents 21 and the air in the body 14 pass around the anode cooler 70 to cool it, and are then sucked into the fan case through the other intake port 84 for the fan 82.

The air sucked into the fan case is discharged into the body 14 through the exhaust ports 86a and 86b. The air discharged through the exhaust port 86a passes through the body 14 and is discharged to the outside through the vents 22. As this is done, the air discharged through the exhaust port 86a is mixed with the air, steam, and carbon dioxide that are discharged through the exhaust port 78 of the cathode passage. The resulting mixture is discharged to the outside of the body through the vents 22. The air discharged through the exhaust port 86b is discharged from the body 14 after having cooled the electromotive unit 52 and its surroundings.

The concentration of the methanol in the mixing tank 54 is detected by the concentration sensor 88. The control section 29 actuates the recovery pump 76 in accordance with the detected concentration to feed the water in the reservoir portion 72c into the tank 54, thereby keeping the methanol concentration constant. The amount of water recovery or steam condensation in the cathode passage is adjusted by controlling the cooling capacity of the cathode cooler 75 in accordance with the level of the water recovered in the reservoir portion 72*c*. In this case, the cooling capacity of the cooler 75 is adjusted to regulate the water recovery amount by controlling drive voltage for the cooling fan 82 in accordance with the water level detected by the water level detector 77.

Figure 9A:
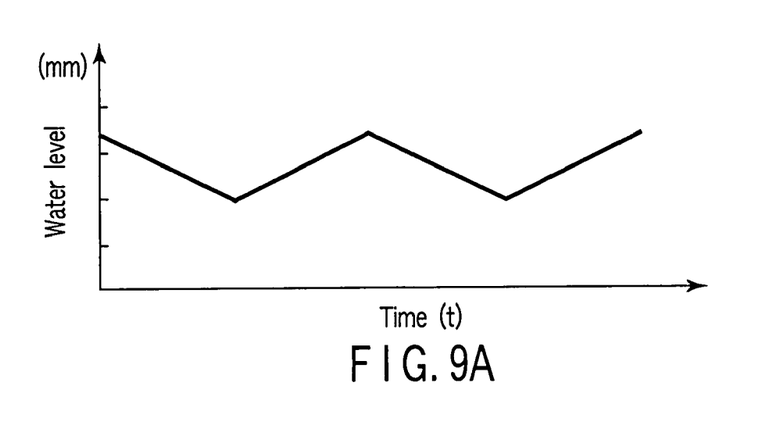
FIGS. 9A, 9B and 9C are diagrams showing relations between the level of water in the cathode passage, drive voltage for a cooling fan, and drive voltage for a recovery pump.
Figure 9B:
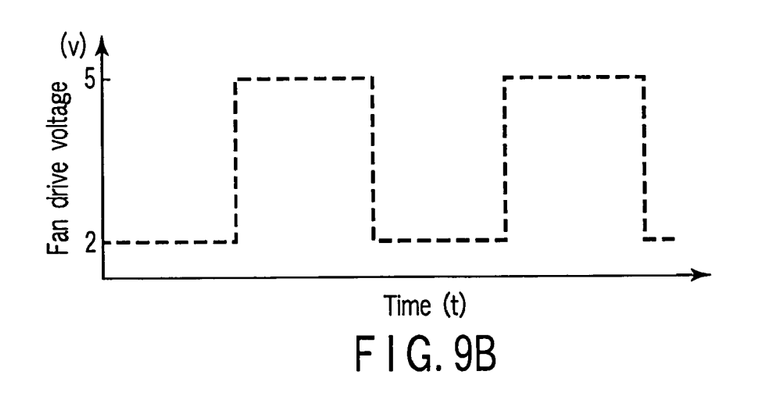

As shown in FIGS. 9A and 9B, the control section 29 switches the drive voltage for the cooling fan 82 from low (e.g., 2 V) to high (e.g., 5 V) to increase the cooling capacities of the fan 82 and the cathode cooler 75 when the level of the water recovered in the reservoir portion 72*c* reaches a given lower limit value. Further, the control section 29 switches the drive voltage for the fan 82 from high to low to lower the cooling capacities of the fan 82 and the cooler 75 when the level of the water recovered in the reservoir portion 72*c* reaches a given upper limit value. Thus, the recovery amount of the water in the cathode passage is adjusted, so that the amount of the water in the reservoir portion 72*c* can be kept within a given range.

Figure 9C:
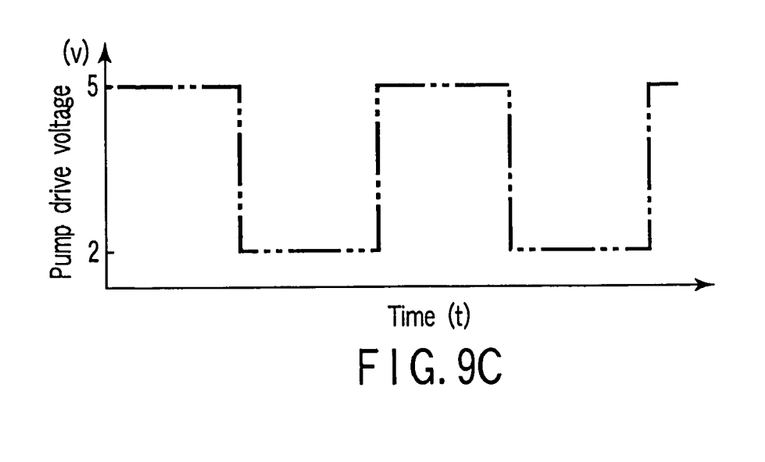

The control section 29 controls the flow rate of the recovery pump 76 in accordance with the level of the water recovered in the reservoir portion 72*c*, thereby keeping the amount of the water in the reservoir portion 72*c* within the given range. More specifically, as shown in FIGS. 9A and 9C, the control section 29 switches drive voltage for the recovery pump 76 from high (e.g., 5 V) to low (e.g., 2 V) to lower the flow rate of the pump 76 and when the level of the water in the reservoir portion 72*c* reaches a given lower limit value. Further, the control section 29 switches the drive voltage for the pump 76 from low to high to increase the flow rate of the pump 76 when the level of the water recovered in the reservoir portion 72*c* reaches a given upper limit value. Thus, the amount of the water in the reservoir portion 72*c* is kept within a given range. Alternatively, the flow rate of the recovery pump 76 may be controlled according to the driving frequency of the pump 76.

According to the fuel cell 10 constructed in this manner, the cathode passage is divided into a plurality of branch passages, and the branch passages are cooled by means of the cathode cooler. By doing this, the water discharged from the electromotive unit 52 can be recovered efficiently and reused for the power generation reaction. Accordingly, the problem of water shortage can be solved, and the fuel of a desired concentration can be supplied to the electromotive unit 52. Thus, the resulting fuel cell can perform stable power generation. A desired amount of water can be maintained for stable power generation by adjusting the cooling capacity of the cathode cooler 75 to control the water recovery amount.

According to the present embodiment, moreover, exhaust air from the cooling fan 82 is mixed with exhaust air from the cathode passage and discharged to the outside of the body 14. Since the exhaust air from the cathode passage contains some moisture, water drops may possibly be formed around the vents 22 of the body 14. However, the moisture can be reduced to prevent formation of water drops by mixing the air from the cathode passage with the exhaust air from the fan 82. Thus, troubles that are attributable to water drops can be prevented to ensure the high-reliability fuel cell.

The present invention is not limited directly to the embodiment described above, and in carrying out the invention, its components may be modified and embodied without departing from the scope or spirit of the invention. Further, various inventions may be made by suitably combining a plurality of components described in connection with the foregoing embodiment. For example, some of the components according to the above-described embodiment may be omitted. Furthermore, components of different embodiments may be combined as required.

Figure 10:
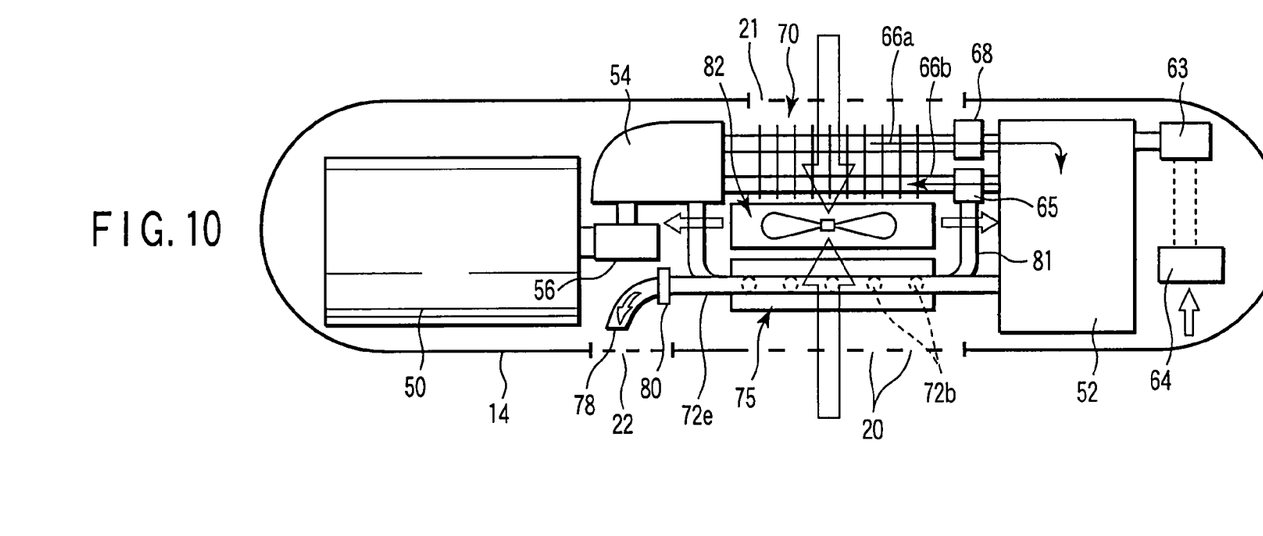
FIG. 10 is a view schematically showing a generator section of a fuel cell according to another embodiment of the invention.

According to the embodiment described above, the generator section comprises the fuel tank 50, electromotive unit 52, anode and cathode coolers 70 and 75, and mixing tank 54 that are arranged in the order named. However, this order of arrangement may be variously changed as required. For example, the electromotive unit 52, anode and cathode coolers 70 and 75, mixing tank 54 and fuel tank 50 may be arranged in this order named in the body 14, as shown in FIG. 10. In this case, the mixing tank 54 and the fuel tank 50 adjoin each other, so that the efficiency of fuel supply can be improved. A fuel cell 10 shown in FIG. 10 shares other configurations with the one according to the foregoing embodiment. Therefore, like reference numerals are used to designate like portions of the two fuel cells, and a repeated description of those portions is omitted.

In the foregoing embodiment, the generator section is provided with the fuel tank and the mixing tank. Alternatively, however, the mixing tank may be omitted, and the fuel tank may be used also as a mixing tank. In the present invention, the fuel tank is a vessel that contains and supplies the fuel, and implies a fuel tank and/or a mixing tank.

The fuel cells according to the present invention are not limited to the use in the personal computer described above, and may be also used as power sources for any other electronic devices, such as mobile devices, portable terminals, etc. The fuel cells are not limited to the DMF and may be of any other types, such as PECKS (polymer electrolyte fuel cells). The cooling fan is not limited to the centrifugal fan and may alternatively be an axial flow fan.

What is claimed is:

1. A fuel cell comprising:
   a housing;
   an electromotive unit which is located in the housing and generates power based on a chemical reaction;
   a fuel tank which is located in the housing and contains a fuel;
   an anode passage through which the fuel is circulated between the electromotive unit and the fuel tank;
   an air supply section which supplies air to the electromotive unit;
   a cathode passage which is connected to the electromotive unit and through which products from the electromotive unit are discharged; and
   a radiator section in the cathode passage,
   the cathode passage having a first passage which extends from the electromotive unit, a plurality of branch passages which diverge from the first passage, a reservoir portion which communicates with the first passage and respective ends of the branch passages and stores water discharged from the first passage and water condensed in the branch passages, and a recovery passage which guides the water stored in the reservoir portion into the fuel tank,
   the radiator section being located corresponding to the branch passages.

2. The fuel cell according to claim 1, which further comprises a cooling fan which circulates cooling air through the radiator section.

3. The fuel cell according to claim 1, wherein the branch passages extend in a direction at an angle to the horizontal direction.

4. A fuel cell according to claim 2, wherein the housing has exhaust holes, the cathode passage has an exhaust port which opens into the housing in the vicinity of exhaust holes, and the cooling fan is located so that exhaust air from the cooling fan is mixed with exhaust air from the exhaust port of the cathode passage and discharged to the outside of the housing through the exhaust holes.

5. A fuel cell according to claim 2, which further comprises a water level detector which is located in the reservoir portion and detects the level of the water in the reservoir portion, and a control section which controls the drive of the cooling fan in accordance with the water level detected by the water level detector.

6. A fuel cell according to claim 2, which further comprises a water level detector which is located in the reservoir portion and detects the level of the water in the reservoir portion and a control section which controls the drive of the cooling fan in accordance with the water level detected by the water level detector, thereby keeping the level of the water in the reservoir portion within a given range.

7. A fuel cell according to claim 1, which further comprises a recovery pump which is located in the recovery passage of the cathode passage and feeds the water stored in the reservoir portion to the fuel tank.

8. A fuel cell according to claim 7, which further comprises a water level detector which is located in the reservoir portion and detects the level of the water in the reservoir portion, and a control section which controls the drive of the cooling fan in accordance with the water level detected by the water level detector.

9. A fuel cell according to claim 2, which further comprises a recovery pump which is located in the recovery passage of the cathode passage and feeds the water stored in the reservoir portion to the fuel tank.

10. A fuel cell according to claim 9, which further comprises a water level detector which is located in the reservoir portion and detects the level of the water in the reservoir portion, and a control section which controls the drive of the cooling fan in accordance with the water level detected by the water level detector.

11. A fuel cell according to claim 1, wherein the fuel tank includes a mixing tank in which the fuel is mixed with water, the mixing tank being connected with a discharge pipe which defines the cathode passage.

* * * * *